(12) United States Patent
Liu et al.

(10) Patent No.: US 8,402,634 B2
(45) Date of Patent: Mar. 26, 2013

(54) METHOD OF CONTINUOUSLY MOUNTING CLIPS TO TWO ABUTTED AND CROSSED RODS

(75) Inventors: An-Chi Liu, Taichung (TW); Yuan-Chi Chiang, Taichung (TW)

(73) Assignee: Basso Industry Corp., Taichung (TW)

( * ) Notice: Subject to any disclaimer, the term of this patent is extended or adjusted under 35 U.S.C. 154(b) by 546 days.

(21) Appl. No.: 12/656,074

(22) Filed: Jan. 15, 2010

(65) Prior Publication Data

US 2010/0175241 A1    Jul. 15, 2010

(30) Foreign Application Priority Data

Jan. 15, 2009 (TW) ............................... 98101444 A

(51) Int. Cl.
*B23P 11/00* (2006.01)
(52) U.S. Cl. ..................................... 29/525.08; 206/340
(58) Field of Classification Search ............... 29/525.08; 206/340
See application file for complete search history.

(56) References Cited

U.S. PATENT DOCUMENTS

| | | | | |
|---|---|---|---|---|
| 2,923,008 A | * | 2/1960 | Ingram | 29/243.56 |
| 4,288,017 A | * | 9/1981 | Russell | 227/67 |
| 4,708,261 A | * | 11/1987 | Sinocchi | 221/289 |
| 5,626,436 A | * | 5/1997 | Dragone | 403/400 |
| 5,881,452 A | * | 3/1999 | Nowell et al. | 29/816 |
| 5,938,099 A | * | 8/1999 | Ciccarelli | 227/19 |
| 6,585,142 B1 | * | 7/2003 | Chen | 227/130 |
| 2007/0284385 A1 | * | 12/2007 | Carraher et al. | 221/27 |
| 2008/0115448 A1 | * | 5/2008 | Kodi | 52/719 |
| 2008/0115449 A1 | * | 5/2008 | Kodi | 52/719 |

* cited by examiner

*Primary Examiner* — David Bryant
*Assistant Examiner* — Jacob Cigna
(74) *Attorney, Agent, or Firm* — Bacon & Thomas, PLLC

(57) ABSTRACT

A method of continuously mounting clips to first and second rods, which are abutted and crossed with each other, includes the steps of a) providing a clip dispensing gun; b) providing clips each having a first rod clipping portion fittable with the first rod and a second rod clipping portion fittable with the second rod; c) loading clips into a clip guiding portion of the clip dispensing gun; d) pushing one of the clips by a clip feeding member of the clip dispensing gun to advance one clip to a ready-to-be-fired position, and e) ejecting the clip in the ready-to-be-fired position out of the clip dispensing gun by using a striker of the clip dispensing gun for enabling first and second rod clipping portions of the ejected clip to be fitted with the first and second rods respectively.

10 Claims, 7 Drawing Sheets

US 8,402,634 B2

METHOD OF CONTINUOUSLY MOUNTING CLIPS TO TWO ABUTTED AND CROSSED RODS

BACKGROUND OF THE INVENTION

1. Field of the Invention

The present invention relates generally to a method of applying clips and more particularly, to a method of continuously mounting clips to two abutted and crossed rods for holding the rods together and tightly.

2. Description of the Related Art

The conventional method of mounting clips to two abutted and crossed rods is realized by using a special hand tool that can exert an external force on the clip to force the clip to be clipped on the two rods. By means of the manually operated hand tool, the clip is applied one at a time by the manpower of a killed person on the abutted and crossed rods. In this way, it is impossible to efficiently mount a large amount of clips on rods in a short time. In addition, if the hand tool is not manipulated properly, the clip may fail to be set on the abutted and crossed rods or an inaccurate mounting of the clip may occur. In other words, it is desired to have an improved method that can apply the clips continuously and accurately on two abutted and crossed rods.

SUMMARY OF THE INVENTION

The present invention has been accomplished in view of the above-noted circumstances. It is an object of the present invention to provide a method of continuously applying clips by using a clip dispensing gun that can continuously feed and strike the clips so as to mount the clip to two abuttedly and crossly arranged rods rapidly.

It is another object of the present invention to provide a method of continuously applying clips, in which the clips can be effectively and accurately fed and positioned in a ready-to-be fired position such that the clip in position can be ejected accurately.

To attain the above objects, the present invention provides a method of continuously mounting clips to first and second rods, which are abutted and crossed with each other, comprising the steps of a) providing a clip dispensing gun having a clip guiding portion, a clip feeding member and a striker; b) providing a plurality of clips, each of which has a first rod clipping portion with a mouth for fitting the first rod, a second rod clipping portion with a mouth for fitting the second rod, a contact portion at a side of the first rod clipping portion opposite to the second rod clipping portion, and a driven portion; c) loading the clips into the clip guiding portion by means of sliding the first rod clipping portion of each clip into the clip guiding portion; d) feeding one clip to a ready-to-be-fired position by means of pushing the contact portion of the clip by the clip feeding member; and e) ejecting the clip in the ready-to-be-fired position out of the clip dispensing gun by means of pushing the driven portion of the clip by the striker for enabling the first and second rod clipping portions of the ejected clip to be fitted with the first and second rods respectively.

Preferably, every two of the clips are connected with each other through a breakable connection. That is to say, the clips are connected one after another through a breakable connection in such a way that the clips form a clip belt loadable into the clip guiding portion of the clip dispensing gun.

In a preferred embodiment of the present invention, the breakable connection that is connected with the clip in the ready-to-be-fired position will be broken after the striker pushes the driven portion of the clip in step e).

Preferably, the clips are stably held in position in the clip guiding portion of the clip dispensing gun by an elastic locating member of the clip dispensing gun.

Preferably, the contact portion of each clip is provided at a leading edge thereof with a first contact, and the elastic locating member is stopped at the first contact of one of the clips in the clip guiding portion of the clip dispensing gun.

Preferably, the contact portion of the clip is provided at a trailing edge thereof with a second contact, and the elastic locating member is stopped at the second contact of the one of the clips too.

In a preferred embodiment, the clip feeding member may be activated by a trigger through compressed air.

In another preferred embodiment, the clip feeding member may be activated by a trigger through a transmission mechanism.

Preferably, the striker includes a head portion with two opposite, inwardly slanted lateral sides for enabling the first rod clipping portion of the clip to be inwardly deformed.

Preferably, the clip is provided with a recess which is recessed from the contact portion toward the first rod clipping portion and parallel to the second rod clipping portion, and the driven portion of the clip is located in the recess.

BRIEF DESCRIPTION OF THE DRAWING

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
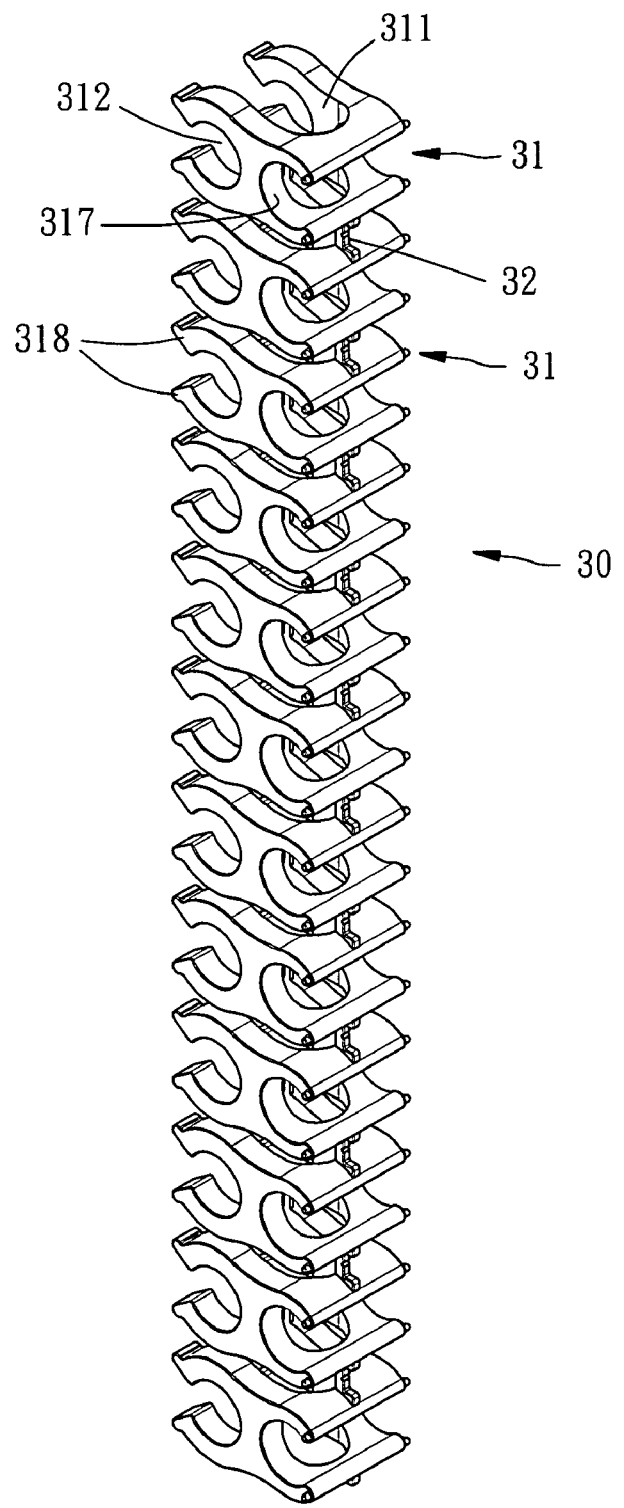
FIG. 1 is a perspective view of a clip belt containing a row of clips used in accordance with a preferred embodiment of the method of the present invention.

The method provided by the present invention is adapted for continuously mounting clips to two abutted and crossed rods. Referring to FIGS. 1-5, the method in accordance with a preferred embodiment of the present invention comprises the following steps.

a) Provide a clip dispensing gun 10, which has a clip guiding portion 11, a clip feeding member 13, a striker 17 and a trigger 19.

b) Provide a plurality of clips 31. Each clip 31 has a first rod clipping portion 311 with a mouth for fitting a first rod that is not shown in the drawing, and a second rod clipping portion 312 with a mouth for fitting a second rod that is not shown in the drawings but should be abutted with the first rod in a cross manner. Each clip 31 further has a contact portion at a side of the first rod clipping portion 311 opposite to the second rod clipping portion 312, and two driven portions 315. The contact portion includes two contacts 313, namely first and second contacts 313 respectively provided at leading and trailing edges of the contact portion when the clip 31 is viewed from the downstream side towards the upstream side of the feeding direction thereof. In the preferred embodiment of the present invention, the first rod clipping portion 311 of the clip 31 is configured to be communicated and crossed with the second rod clipping portion 312 of the clip 31. Further, it will be appreciated that the locations of the contacts 313 may be adjacent to or the same as the locations of the driven portions 315.

Further more, the clip 31 has a recess 317, which is recessed from the contact portion toward the first rod clipping portion 311 in such a way that the recess 317 is parallel to the second rod clipping portion 312 and communicated with the first rod clipping portion 311. Besides, a grip portion 318 is provided at a predetermined location of the mouth of the second rod clipping portion 312 for firmly gripping the second rod.

c) Load the clips 31 into the clip guiding portion 11 of the clip dispensing gun 10 by means of sliding the first rod clipping portion 311 of each clip 31 into the clip guiding portion 11 of the clip dispensing gun 10.

d) Activate the clip feeding member 13 to advance the topmost clip 31 in a clip belt 30 to a ready-to-be-fired position in alignment with the axial direction of the striker 17 by means of pushing the contact portion of the clip 31 by the clip feeding member 13.

e) Activate the striker 17 to enable the striker 17 to move forward to rapidly push the driven portions 315 of the clip 31 that is in the ready-to-be-fired position so as to eject the clip 31 out of the clip dispensing gun 10 for enabling the first and second rod clipping portions 311 and 312 of the ejected clip 31 to be fitted with the first and second rods respectively.

Detailed description of the above-mentioned elements of the preferred embodiment of the present invention will be given hereunder.

In the above-mentioned preferred embodiment of the present invention, every two of the clips 31 are connected with each other through a breakable connection 32 such that the clips 31 form a clip belt 30, as shown in FIG. 1 and the recesses of the clips are parallel to but not aligning to each other.

In the above-mentioned preferred embodiment of the present invention, the breakable connection 32 that is connected between the clip 31 in the ready-to-be-fired position and the next clip 31 will be broken after the striker 17 pushes the driven portions 315 of the clip 31 in the ready-to-be-fired position in step e).

Figure 2:
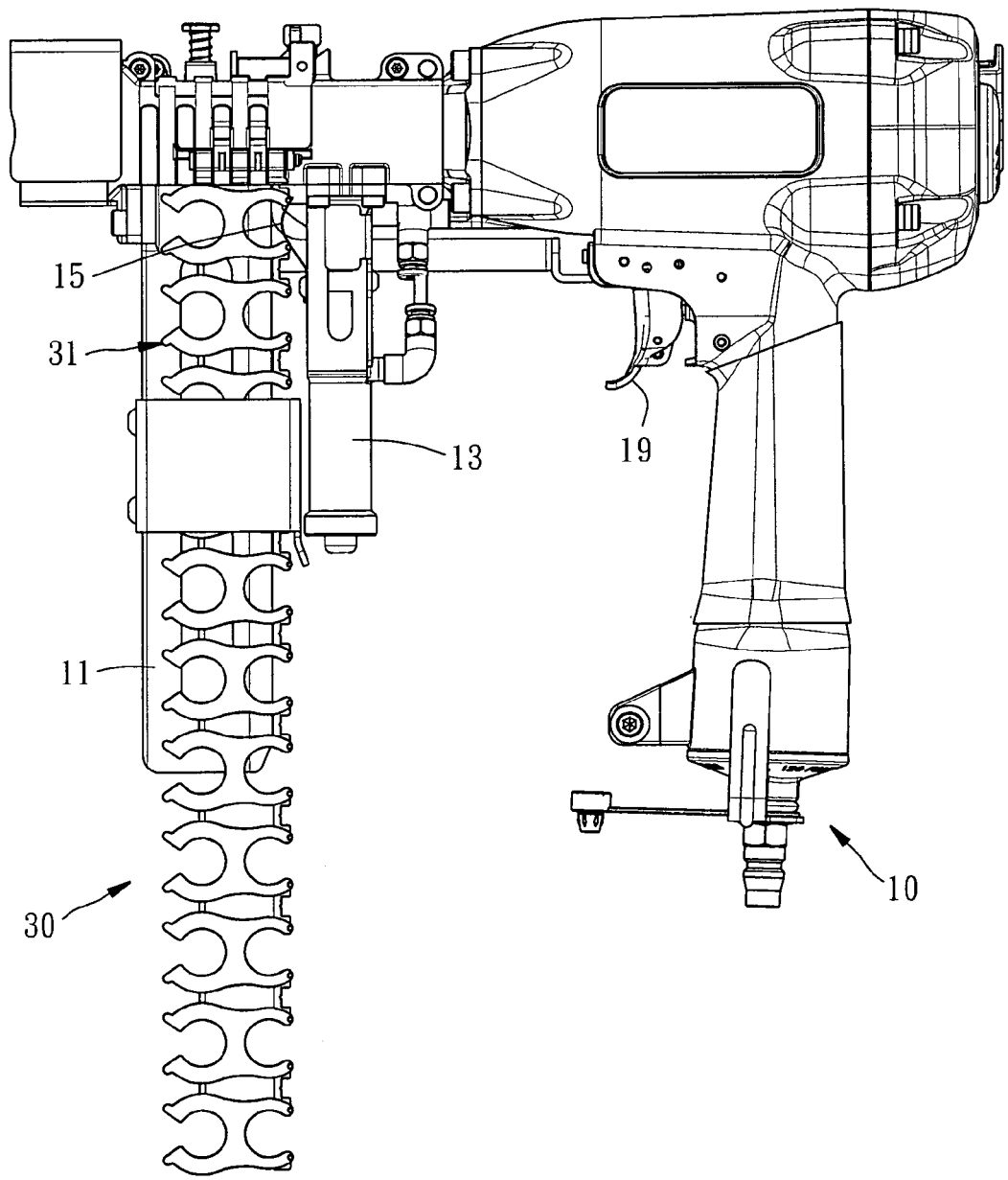
FIG. 2 is a schematic drawing, showing that the clip belt is loaded in the clip guiding portion of the clip dispensing gun used in accordance with the preferred embodiment of the method of the present invention.
Figure 3:
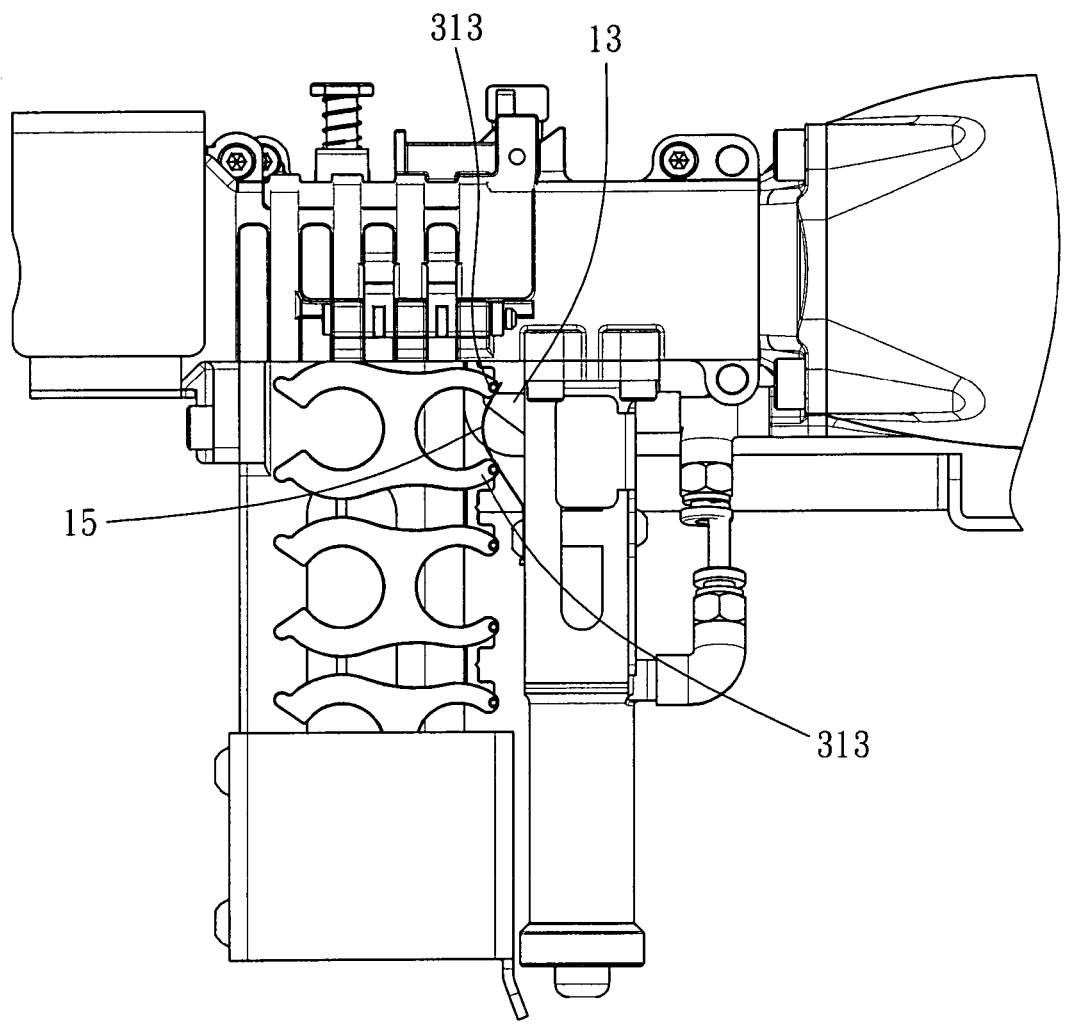
FIG. 3 is an enlarged view of a part of FIG. 2.
Figure 4:
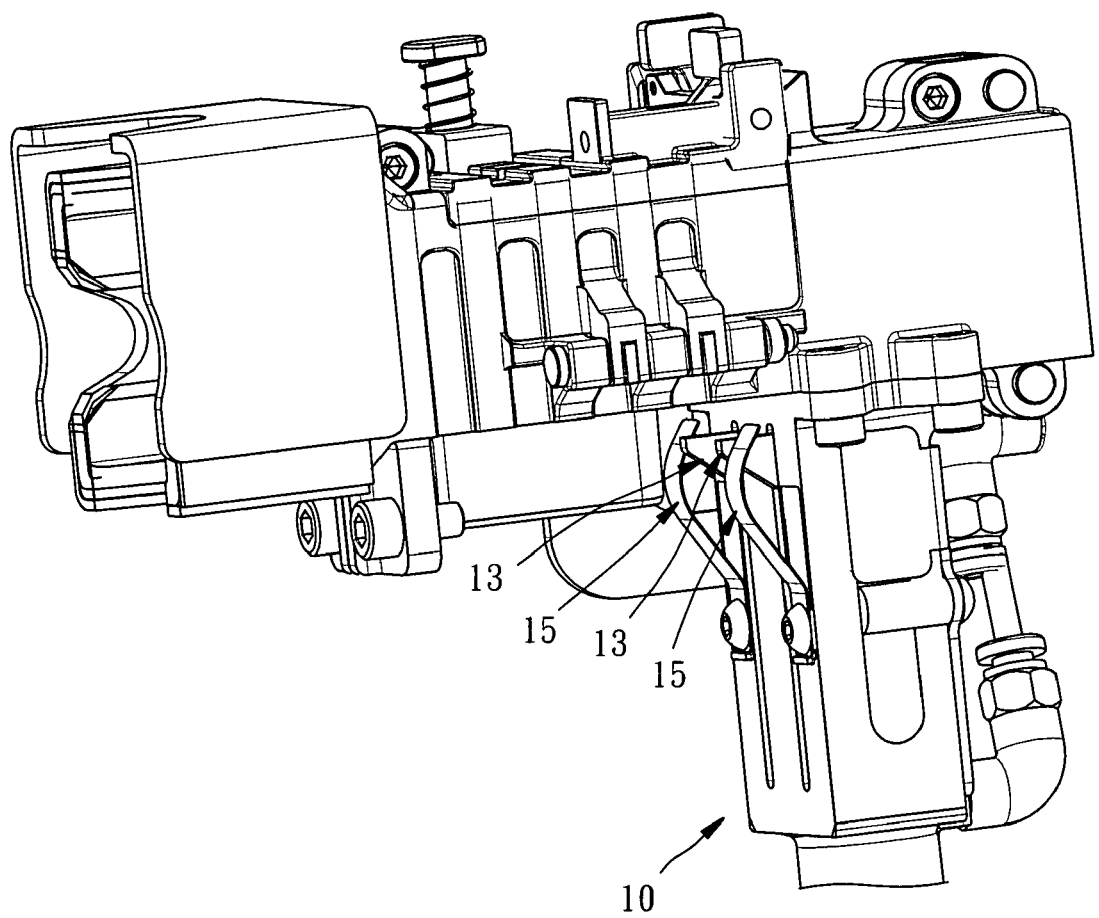
FIG. 4 is a perspective view of a part of the clip dispensing gun used in the present invention.
Figure 5:
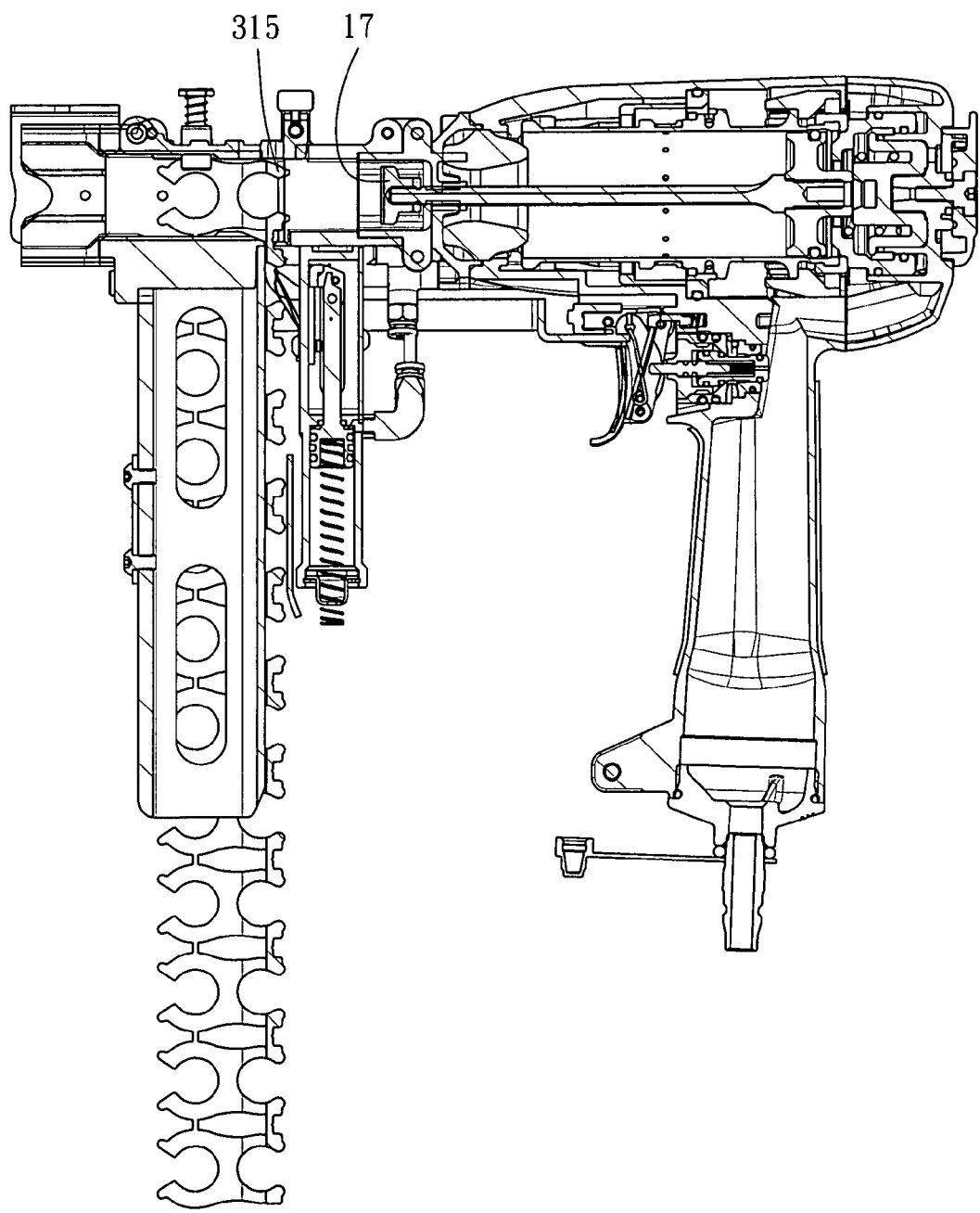
FIG. 5 is a sectional view of FIG. 2.

As shown in FIGS. 2 and 3, the clip dispensing gun 10 is further provided with an elastic locating member 15, such that the clip 31 that is to be fed to the ready-to-be-fired position, i.e. the clip 31 next to the clip 31 in the ready-to-be-fired position, is stably held in the clip guiding portion 11 of the clip dispensing gun 10 by the elastic locating member 15.

In the above-mentioned preferred embodiment of the present invention, the elastic locating member 15 is simultaneously stopped at the first and second contacts 313 respectively provided at the leading and trailing edges of the contact portion of the clip 31 when the clip 31 is viewed toward the feeding direction of the clip 31, as shown in FIGS. 2 and 3. However, it will be appreciated that the elastic locating member 15 may be solely stopped at the first contact 313 provided at the leading edge of the contact portion of the clip 31 to hold the clip 31 in position in the clip guiding portion 11 of the clip dispensing gun 10.

In the above-mentioned preferred embodiment, the clip feeding member 13 is activated by the trigger 19 through compressed air.

Figure 6:
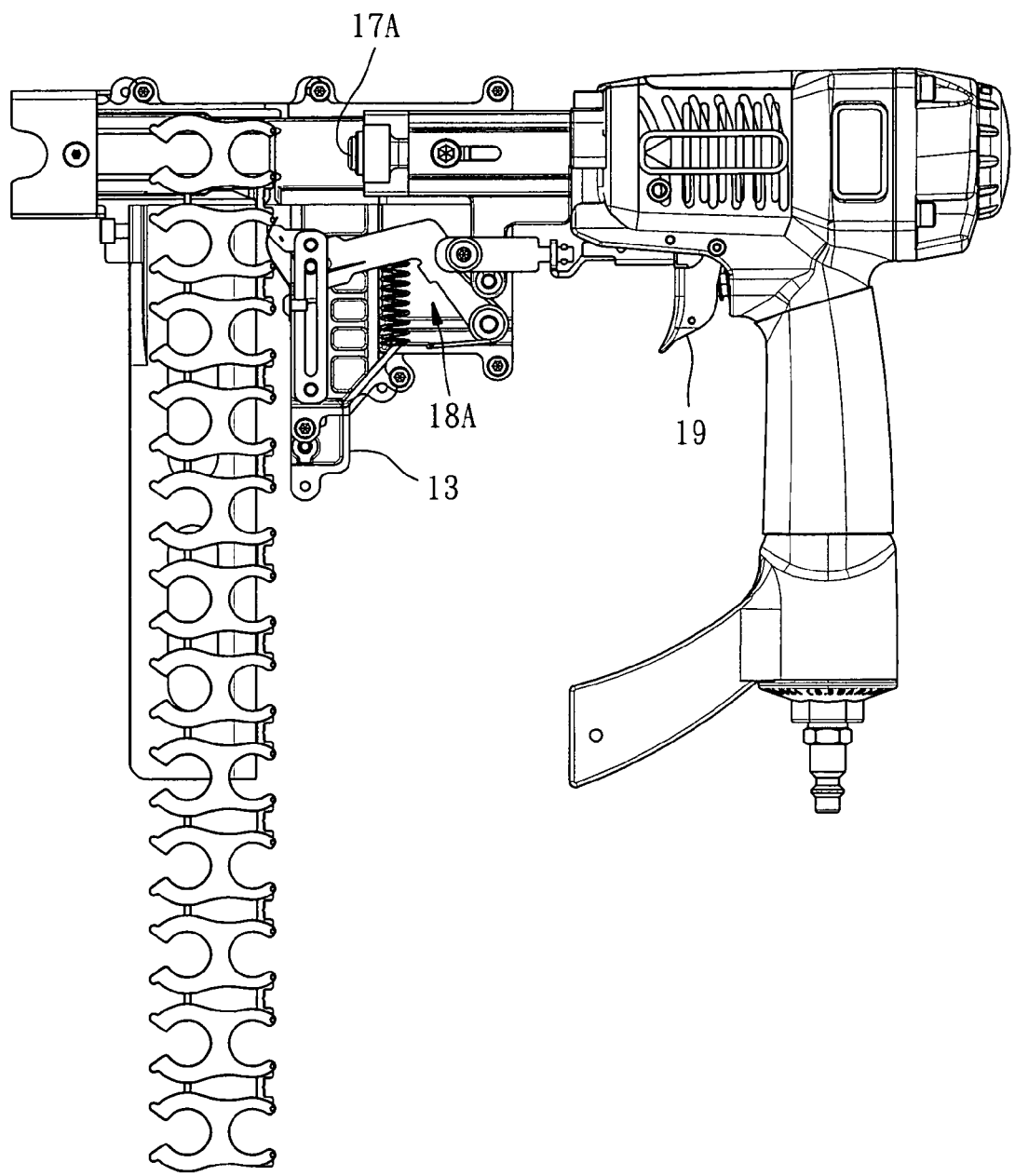
FIG. 6 is a schematic drawing, showing that the clip belt is loaded in the clip guiding portion of the clip dispensing gun used in accordance with another preferred embodiment of the method of the present invention.

In another preferred embodiment, as shown in the FIG. 6, the clip feeding member 13 is activated by the trigger 19 through a transmission mechanism 18A. In addition, the striker 17A used in this preferred embodiment has a stepped head portion.

Figure 7:
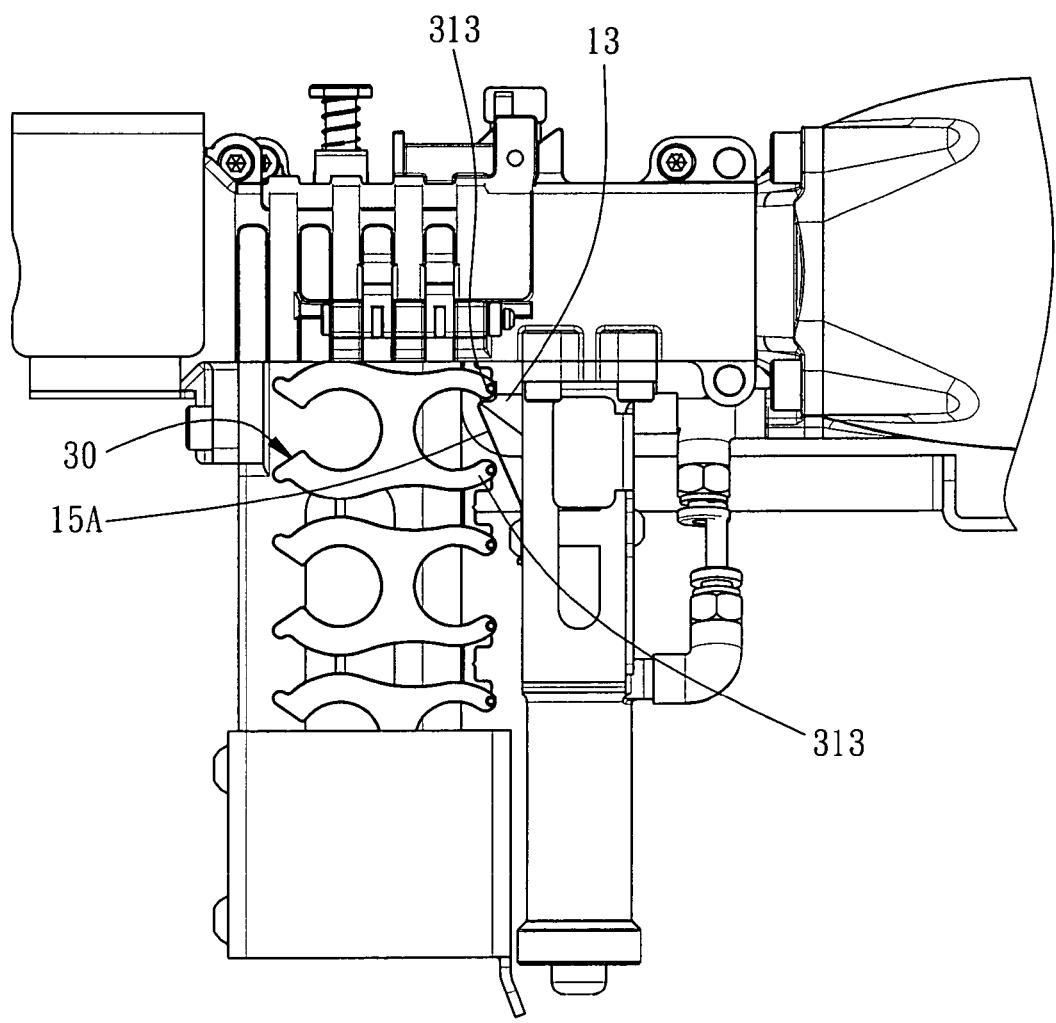
FIG. 7 is a schematic drawing, showing that the clip belt is loaded in the clip guiding portion of the clip dispensing gun used in accordance with still another preferred embodiment of the method of the present invention.

FIG. 7 shows that an alternate form of the elastic locating member 15A can be used. The tip portion of the elastic locating member 15A is stopped at the inner edge of the first contact 313 at the leading edge of the contact portion of the clip 31 only. By this way, the clip 31 can also be held in position in the clip guiding portion 11 of the clip dispensing gun 10.

It will be appreciated that the form of the striker or the clip may not be limited to the above described. For example, the striker 17 of the clip dispensing gun 10 may be configured having a head portion with two opposite, inwardly slanted lateral sides for enabling the first rod clipping portion 311 of the clip 31 to be inwardly deformed. In addition, the driven portion 315 of the clip 31 can be provided at the bottom of the recess 317 which is recessed from the contact portion toward the first rod clipping portion 311.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of continuously mounting clips to first and second rods, which are abutted and crossed with each other, the method comprising the steps of:
    a) providing a clip dispensing gun having a clip guiding portion, a clip feeding member and a striker;
    b) providing a plurality of clips, each of which has a first rod clipping portion with a mouth for fitting one of the first rods, a second rod clipping portion with a mouth for fitting one of the second rods, a contact portion at a side of the first rod clipping portion opposite to the second rod clipping portion, and a driven portion;
    c) loading the clips into the clip guiding portion by means of sliding the first rod clipping portion of each said clip into the clip guiding portion;
    d) feeding one of said clips to a ready-to-be-fired position in a feeding direction by means of pushing the contact portion of the one of said clips by the clip feeding member; and
    e) ejecting the clip in the ready-to-be-fired position out of the clip dispensing gun by means of pushing the driven portion of the clip by the striker for enabling the first and second rod clipping portions of the ejected clip to be fitted with the first and second rods respectively;
    wherein each of the clips in step b) further has a first contact provided at a leading edge of the contact portion, a second contact provided at a trailing edge of the contact portion, and a recess recessed from the contact portion toward the first rod clipping portion and being parallel to the second rod clipping portion, the first contact, the second contact and the recess of each clip are vertical to the feeding direction;
    wherein the clips in step b) are connected one after another through a breakable connection, such that the clips form a clip belt, and the recesses of the clips are parallel to but not aligning to each other; and wherein the clip dispensing gun comprises an elastic locating member for stably holding the clips in position in the clip guiding portion of the clip dispensing gun, and the elastic locating member is stopped at the first contact of one of the clips in the clip guiding portion.

2. The method as claimed in claim 1, wherein the breakable connection that is connected with the clip in the ready-to-be-fired position is broken after the striker pushes the driven portion of the clip in step e).

3. The method as claimed in claim 1, wherein the contact portion of each of the clips is provided at a trailing edge thereof with a second contact, and the elastic locating member is stopped at the second contact of the one of the clips.

4. The method as claimed in claim 1, wherein the clip feeding member is activated by a trigger through compressed air.

5. The method as claimed in claim 1, wherein the clip feeding member is activated by a trigger through a transmission mechanism.

6. The method as claimed in claim 1, wherein the striker includes a head portion with two opposite, inwardly slanted lateral sides for enabling the first rod clipping portion of the clip to be inwardly deformed.

7. The method as claimed in claim 1, wherein the driven portion of the clip is located in the recess.

8. The method as claimed in claim 1, wherein the recess is communicated with the first rod clipping portion.

9. The method as claimed in claim 1, wherein the clip includes a grip portion at the mouth of the second rod clipping portion for firmly gripping the second rod.

10. The method as claimed in claim 1, wherein each breakable connection is in connect with the second contact of one of the clips and the first contact of the adjacent trailing clip.

* * * * *